(12) United States Patent
Stall et al.

(10) Patent No.: US 8,171,232 B2
(45) Date of Patent: May 1, 2012

(54) STORED VALUE ACCESSORS IN SHARED MEMORY REGIONS

(75) Inventors: Jonathon Michael Stall, Bothell, WA (US); Gregg Bernard Miskelly, Seattle, WA (US); Richard Michael Byers, Bellevue, WA (US); Eric H. Feiveson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 631 days.

(21) Appl. No.: 12/338,685

(22) Filed: Dec. 18, 2008

(65) Prior Publication Data

US 2010/0161910 A1     Jun. 24, 2010

(51) Int. Cl.
*G06F 12/00* (2006.01)

(52) U.S. Cl. ......................................... 711/147; 711/170

(58) Field of Classification Search .................. 711/147, 711/170
See application file for complete search history.

(56) References Cited

U.S. PATENT DOCUMENTS

| | | | |
|---|---|---|---|
| 6,088,779 A | 7/2000 | Bharadhwaj | |
| 6,637,024 B1 | 10/2003 | Johnson et al. | |
| 6,795,962 B1 | 9/2004 | Hanson | |
| 7,296,136 B1 * | 11/2007 | Collard et al. | 711/203 |
| 7,370,360 B2 | 5/2008 | van der Made | |
| 2005/0055682 A1 | 3/2005 | Gadre et al. | |
| 2006/0031643 A1 * | 2/2006 | Figueira | 711/154 |
| 2008/0270728 A1 * | 10/2008 | Pohl et al. | 711/170 |
| 2009/0037685 A1 * | 2/2009 | Hansen | 711/171 |

OTHER PUBLICATIONS

Non Patent Literature, "PDB: Pervasive Debugging With Xen", Alex Ho, Nov. 8, 2004, pp. 1-21.*
"Debugging Linux kernels with Workstation 6.0", Retrieved at<<http://stackframe.blogspot.com/2007/04/debugging-linux-kernels-with.html>>, Apr. 17, 2007, pp. 1-8.
"Microsoft Virtual PC 2004 Development and Debugging", Retrieved at<<http://www.microsoft.com/windows/products/winfamily/virtualpc/overview.mspx>>, Sep. 30, 2008, p. 1.
King, et al."Debugging Operating Systems with Time-Traveling Virtual Machines", Retrieved at<<http://www.usenix.org/event/usenix05/tech/general/king/king.pdf>>, 2005 USENIX Annual Technical Conference, USENIX Association, pp. 1-15.
Ho, et al."PDB: Pervasive DebuggingWith Xen", Retrieved at<<http://www.cl.cam.ac.uk/research/srg/netos/papers/2004-grid.pdf>>, pp. 6.

* cited by examiner

*Primary Examiner* — Matthew Bradley
(74) *Attorney, Agent, or Firm* — Microsoft Corporation

(57) ABSTRACT

Instruction sets in computing environments may execute within one of several domains, such as a natively executing domain, an interpretively executing domain, and a debugging executing domain. These domains may store values in a shared region of memory in different ways. It may be difficult to perform operations on such values, particularly if a domain that generated a particular value cannot be identified or no longer exist, which may obstruct shared accessing of values and evaluative tasks such as stack walks. Instead, accessors may be associated with a stored value that perform various operations (such as low-level assembly instructions like Load, Store, and Compare) according to the standards of the value-generating domain, and domains may be configured to operate on the value through the accessors. This configuration may promote consistent accessing of values without having to identify or consult the value-generating domain or reconfiguring the instruction sets.

20 Claims, 6 Drawing Sheets

STORED VALUE ACCESSORS IN SHARED MEMORY REGIONS

BACKGROUND

Within the field of computing, many scenarios involve the execution of an instruction set (such as a program) in one of several domains that may differ in certain properties. For example, a native execution domain may execute fully compiled instructions directly on the processor; an interpretive executing domain may interpret partially compiled or uncompiled instructions just before execution on the processor; a virtual execution domain may define a virtual machine in which the instructions are executed on a virtual processor; and a debugging execution domain may attach various monitoring aspects to the executing instructions.

The code executed within such domains often involves the storing of values in a region of memory of the computer. The value may represent a primitive type, such as an integer or a string; a plurality of several values, such as an array; a composite of several values, such as a structure or a class instance; or a reference to a memory location, such as a pointer. The memory allocated for storing these values may also take many forms, such as a region of randomly accessible memory, a stack, a queue, and a heap. Moreover, a region may store values generated in several domains, such as in a shared memory region that is accessible to multiple processes. The values may even be shared among code executed in several domains; e.g., a value may be written to memory by instructions executing in a first domain and read from memory by instructions executing in a second domain.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Where various domains may store and use values in a shared memory region, problems may arise where the domains are configured to use memory and access such values in different ways. As a first example, a primitive type, such as an integer, may vary in length among various domains; e.g., a natively executing domain may store a 64-bit integer generated by a 64-bit processor, while an interpretively executing domain may store a 32-bit integer generated for compatibility with interpreted code, and a 16-bit integer may be generated by a simulated virtual machine. A problem may arise where a first domain endeavors to read or utilize an integer written to a shared memory space by a second domain, because the length used by each domain may differ, and it may be difficult to identify the length based on a simple examination of the memory. As a second example, even a similarly defined class instance may be stored in the region of the memory in different ways by different domains; e.g., a debugging domain may store with the class instance some debugging information (such as a symbol name or a list of references to the class instance) that may not be stored by a non-debugging domain. When a domain endeavors to access a class instance written to the shared memory region by another domain, it may be difficult to determine the structure, contents, and order of values comprising the class instance stored in memory. These factors may result in inter-domain compatibility and communication problems and incorrect or inaccurate data reads.

One technique for reducing these problems involves allowing each domain to specify how the values stored in the region of memory are to be accessed. This may be achieved by allowing each domain to associate a set of accessors with a stored value, where each accessor performs a comparatively low-level operation on the value, such as a load or store, an arithmetic or logical operation or comparison, or a memory dereferencing. Each domain may therefore provide a set of accessors that are configured to perform the operation according to the characteristics of the value type (such as the nature, organization, format, and range of acceptable values) as defined by the domain. For example, if the domain generally defines integers according to a 16-bit, little-Endian format, then the domain may, upon storing an integer in the region of memory, associate with the value a set of accessors that perform low-level operations (such as load, store, increment, and compare to zero) on the value as a 16-bit integer. When another domain executes an instruction that references the value is executed, instead of directly accessing the value, the domain may select and invoke the corresponding accessor that is associated with the value in the region of memory. This technique may promote the consistent accessing of the value in the region of memory, even among domains that represent the value in different ways. Moreover, this technique may promote the appropriate handling of a value in the region of memory even if the domain that generated the value cannot be identified or no longer exists.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
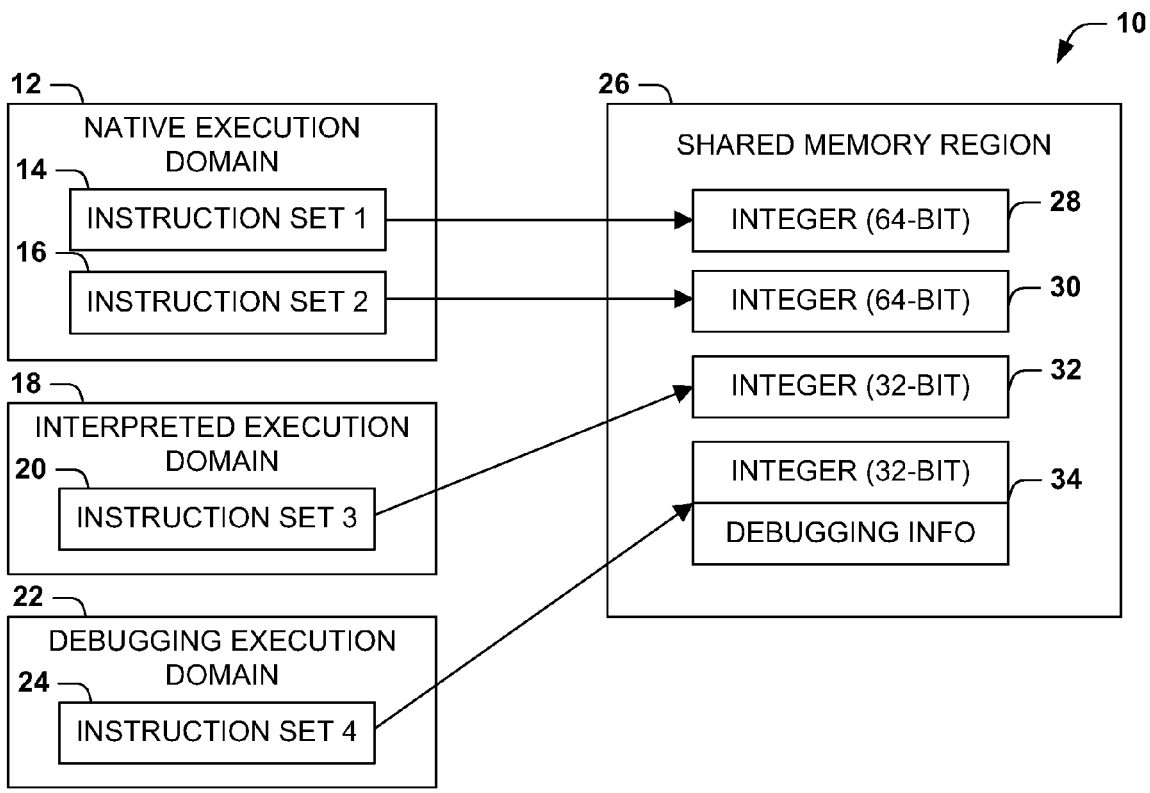
FIG. 1 is an illustration of an exemplary scenario involving the storing of values in a region of memory generated by various domains.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

In the field of computing, the execution of an instruction set (such as a program) may occur within a particular domain, which may define many aspects of the execution. Respective domains may therefore execute the instruction set differently in furtherance of particular advantages, such as performance, safety, and inspection capabilities. For example, a first domain may be configured for interpretively executing a set of partially compiled or uncompiled instructions on the processor, such as by examining respective instructions and choosing corresponding fully compiled instructions for execution. This first domain might be helpful, e.g., for examining the code for errors or vulnerabilities (such as bad pointer references) and for configuring the code for the particular computing environment (such as the available hardware of the computing environment; however, the on-the-fly interpreting may impact the performance of the executing code. A second domain may be configured for natively executing a set of fully compiled instructions on the processor, which may provide high performance, but may not be amenable to oversight and may be less able to adapt to the available hardware. A third domain may be configured for executing the instructions in a virtual machine having a set of emulated hardware components and a separate memory store, which may permit execution of untrusted code without jeopardizing the local computing environment. A fourth domain may be configured for executing the instructions in a debugging context, where the executing is states of particular data objects may be monitored, the occurrence of particular events may be logged, and effects may be simulated without perturbing the state of the debuggee.

Instruction sets often involve the storing of values in a region of memory. For example, a process executing an instruction set (within a particular domain) may be provided a stack whereupon working values may be stored, such as parameters passed to invoked functions and the return address of the instruction that invoked the function. Such instruction sets may also generate and store values involved in the logical processing of the instructions, such as primitive types (e.g., integers, strings, and Boolean values), data structures (e.g., one or more instances of a class), and memory references (e.g., pointers to primitive types, data structures, and functions.) The stored values may also be organized in many ways, such as an array or linked list, a tree structure, a hashtable, a stack, etc.

In some scenarios, a region of memory may be accessible to and shared by several or many instruction sets, each of which may store in the region of memory many values of many types and organized in many manners. Although such sharing may raise issues with regard to security and concurrency, the sharing may be advantageous in many aspects, such as economizing resources (e.g., by reducing unnecessary and performance-consuming isolation boundaries), improving performance (e.g., a performance-improving memory cache may be devised to cache similar data items used by various instruction sets), and interprocess communication (e.g., by allowing several instruction sets to share access to one or more shared values.)

The instruction sets that share access to a region of memory may execute within different domains, each of which may define different ways of generating and storing such values.

FIG. 1 illustrates an exemplary scenario 10 wherein various instruction sets operating within various domains may share a memory region 26 wherein an instruction set may store integers for access by other instruction sets. While the shared integers may be generated for a common purpose, and may even be generated by logically equivalent instruction sets (such as several executing instances of the same instruction set), the different domains in which the instruction sets are executing may differently format and organize the integers stored in the shared memory region 26. For example, a first instruction set 14 and a second instruction set 16 may execute within a native execution domain 12, which, upon executing an instruction in an instruction set that generates and stores an integer, may store in the memory region 26 a 64-bit integer. Thus, a first instruction set 14 may generate a first integer 28 that the native execution domain 12 stores as a 64-bit integer, and a second instruction set 16 may generate a second integer 30 that the native execution domain 12 stores as a 64-bit integer. However, a third instruction set 20 may execute in an interpreted execution domain 18, which may fulfill a request by the third instruction set 20 to store a third integer 32 in the shared memory region 26 according to a 32-bit format. A fourth instruction set 24 may execute within a debugging execution domain 22, which may be configured to store integers generated by executed instruction sets (such as a fourth integer 32 generated by the fourth instruction set 24) as 32-bit values, but may also store with the integers a set of debugging information (e.g., symbol names, owning processes, and lists of references to the respective integer) that may be useful in debugging code associated with the integers. The stored integers may also vary in other ways (e.g., signed vs. unsigned; signed one's-complement values vs. signed two's-complement values; little-Endian ordering vs. big-Endian ordering; and boxed vs. unboxed values.)

However, the variance in storing integers according to the standards of various domains may cause problems. As a first example, when an instruction set accesses an integer stored in the memory region 26, it may not receive the type of integer that is anticipated by the instruction set. This discrepancy may occur even for integers shared between two instances of the same instruction set (such as two threads running the same code) if the instances are executing within different domains. An instruction set may not even depend on an integer that it has generated and stored in the shared memory region 26 as retaining the same format during a subsequent access, because another instruction set may have accessed the integer in the interim and modified its formatting (e.g., while performing an increment operation.) Moreover, it might not be possible to extrapolate the formatting of the integer according to the domain that created a particular integer in the memory region 26, because may be difficult to identify the value-generating domain, which, in some cases, may no longer exist. Thus, a particular instruction set may be unable to determine the types of values stored in the memory region 26—even if the integers were generated by a single codebase that has executed in several domains. If the generating domain may be identified, a significant performance penalty may be incurred if accessing the value involves identifying the value-generating domain, identifying the particular manner in which the domain stores values, and adjusting the accessing according to the standards of the domain; however, these additional tasks may impose a significant performance penalty in accessing the value. Such incapabilities may particularly impact tasks that are likely to operate on regions of memory shared among instruction sets executing in various domains, such as stack traces that attempt to analyze the values stored on a stack shared among instruction sets executing in multiple domains.

Figure 2:
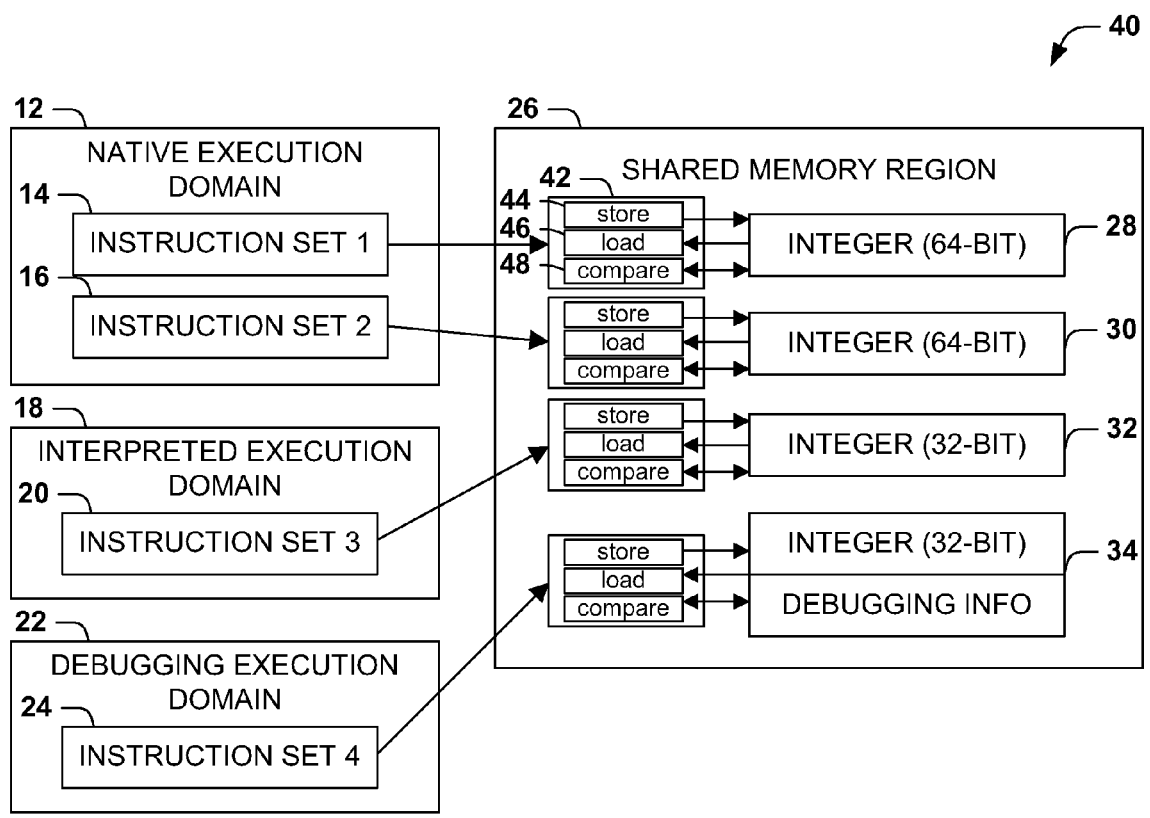
FIG. 2 is an illustration of another exemplary scenario involving the storing of values in a region of memory generated by various domains.

One technique for reducing or avoiding these problems involves associating a set of accessors for performing various (comparatively low-level) operations on the value. FIG. 2 illustrates an exemplary scenario 40 wherein the domains are configured, upon storing a value (such as an integer) in the memory region 26, to associate with the value a set of accessors 42, where respective accessors are configured to perform a particular operation on the value, such as a load, a store, a mathematical or logical comparison or operation, or a memory dereferencing. When an instruction in an executing instruction set attempts to access a value in the memory region 26, the domain within which the instruction set executes may again perform the accessing; but instead of directly accessing the value stored in the memory region 26, the domain may select and invoke the accessor corresponding to the type of instruction. For example, the first integer 28 stored in the memory region 26 may be associated with (among others, not shown) a store accessor 44, a load accessor 46, and a compare accessor 48 that perform (respectively) a storing of a new integer value for the first integer 28, a loading of the current value of the first integer 28, and a comparing of the value of the first integer 28 with a specified value (such as another integer stored in the memory region 26, a constant value such as zero, etc.) The accessors may correspond to particular low-level operations (e.g., accessors may be provided for respective opcodes in the compiled language, such as Load, Store, and Compare assembly instructions), and may perform the operations on the value stored in the memory region 26 in a standardized manner (e.g., the load accessor 46 may be configured to reformat the integer in a particular manner requested by or identified with the domain that hosts the accessing instruction set.) By configuring the memory region 26 to associate accessors with respective stored values, and by configuring the domains to access stored values through the accessors rather than directly accessing the memory region 26 in a potentially inconsistent way, this technique may promote the consistent treatment of the stored values, may facilitate inspection of the memory region 26 and values contained therein (such as stack tracing), and may improve the logical consistency and robustness of instruction sets independently of the nature of the requesting domain and the domain that last accessed the value. Moreover, this independence may be achieved without having to reconfigure the instruction sets that generate or access the values; e.g., the instruction sets may declaratively or imperatively specify operations (such as low-level assembly instructions like Load, Store, and Compare) on the value as if it were directly accessible in the memory, but the domains and runtime components may be configured to handle such requests through the accessors associated with the value according to the techniques discussed herein.

An exemplary scenario in which this problem and solution may arise involves the debugging of a particular instruction set (the "debuggee") executing in a first domain by a set of debugging tools (the "debugger") executing in a second domain. The debugger may wish to invoke a particular function defined in the debuggee to get the results, but wish to avoid any side-effects of the function. This invocation could normally cause the debuggee to alter the state of one or more values of the debuggee in a way that may compromise its logical flow or not even be physically possible if the debuggee is immutable (such as when inspecting a memory dump file post-mortem). In order to avoid creating side-effects in the debuggee the debugger may access the values of the debuggee in the region of memory through accessors that are configured to simulate an operation. For example, a store accessor may store the new value in some auxiliary storage, without modifying the debuggee. Then future read accessors will fetch the value from the auxiliary storage. This simulates a store operation to the debuggee without ever actually modifying the debuggee. In this manner, the debugger executing in the second domain may freely access and even simulate altering the values of the debuggee executing in the first domain without compromising the state of the debuggee.

Figure 3:
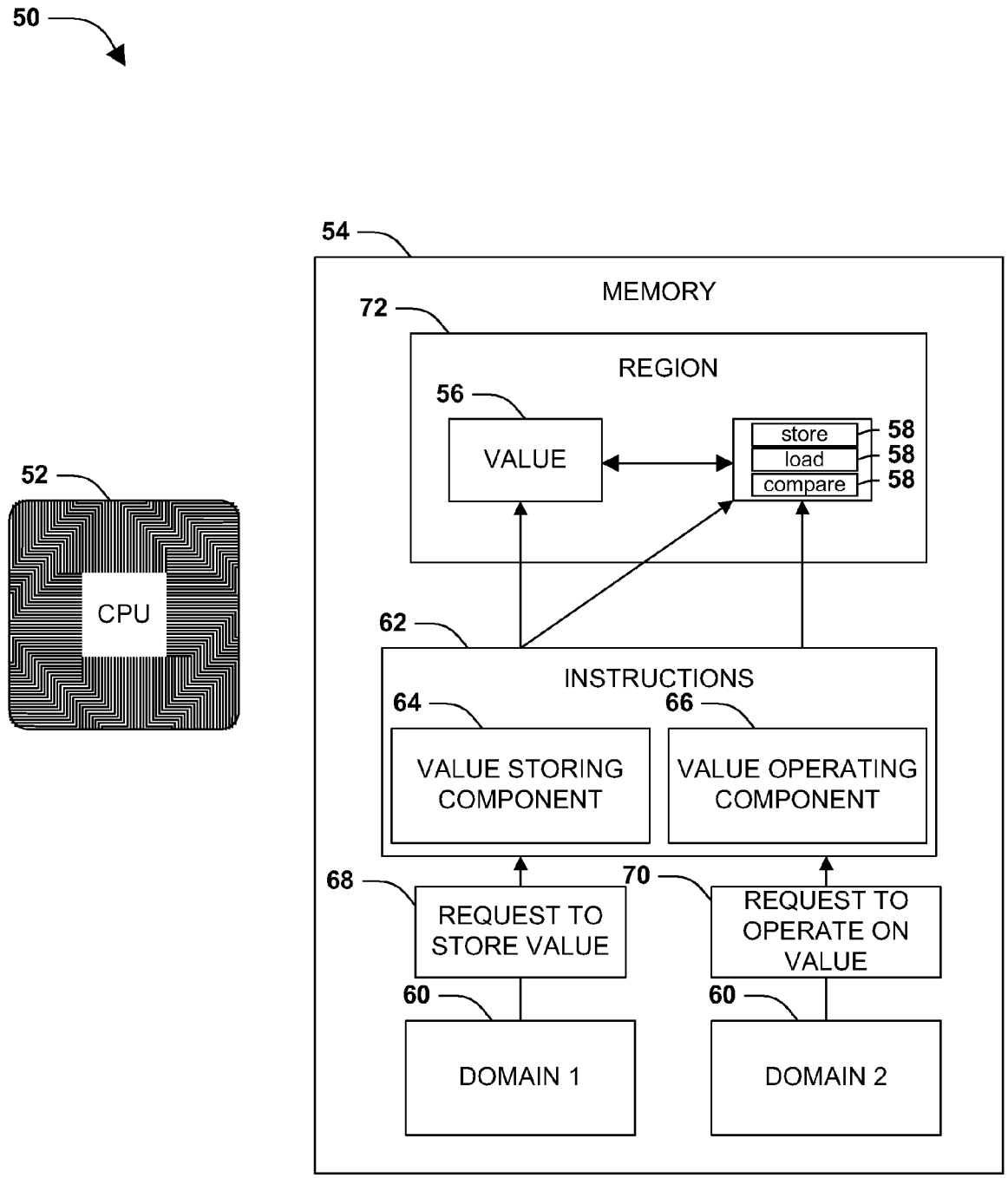
FIG. 3 is a component block diagram illustrating an exemplary system configured to store values generated by at least two domains in a region of a memory of a computer having a processor.

FIG. 3 illustrates a first embodiment of these techniques, comprising an exemplary system 62 configured to store values 56 generated by at least two domains 60 in a region 72 of a memory 54 of a computer having a processor 52. The exemplary system 62 comprises instructions configured to execute on the processor 52 in order to achieve or promote the storing of such values in the memory 54. The exemplary system 62 comprises a value storing component 64, which is configured, upon receiving a request 68 to store a value 56 generated by a domain 60, to store the value 56 in the region 72 of the memory 54, and to associate with the value 56 at least one accessor 58 associated with the domain 60 and configured to operate on the value 56 stored in the memory 54. The exemplary system 62 also comprises a value operating component 66 configured, upon receiving a request 70 to apply an operation to the value 56, to retrieve from the memory 54 an accessor 58 associated with the value 56 and capable of applying the operation to the value 56 in the region 72 of the memory 54, and to invoke the accessor 58. The exemplary system 62, when stored in the memory 54 and executing on the processor 52 of the computer, thereby achieves the storing of the value 56 and the application of operations to the value 56 on behalf of various domains 60 in a manner irrespective of the nature of the generating domain and the operation requesting domain.

Figure 4:
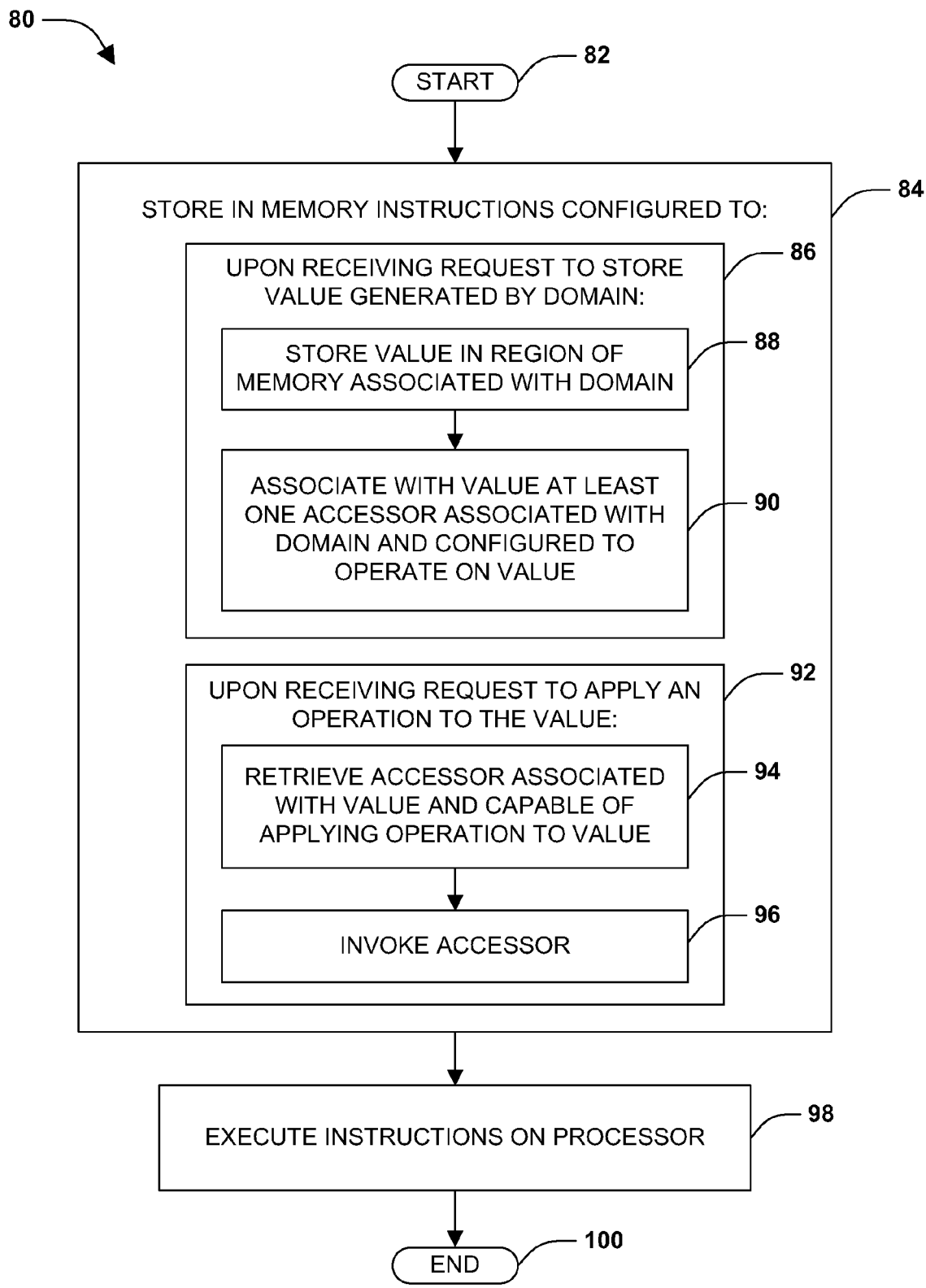
FIG. 4 is a flow chart illustrating an exemplary method of storing values generated by at least two domains in a region of a memory of a computer having a processor

FIG. 4 illustrates a second embodiment of these techniques, comprising an exemplary method 50 of storing 56 values generated by at least two domains 60 in a region 72 of a memory 54 of a computer having a processor 52. The exemplary method 80 begins at 82 and involves storing 84 in the memory 54 instructions configured, when executed on processor 52, to achieve the storing of the values 56 in the memory 54. For example, the instructions may be configured, upon receiving 86 a request to store a value 56 generated by a domain 60, to store 88 the value 56 in the region 72 of the memory 54, and to associate 90 with the value 56 at least one accessor 58 associated with the domain 60 and configured to operate on the value 56 stored in the region 72 of the memory 54. The instructions may also be configured, upon receiving 92 a request to apply an operation to the value 56, to retrieve from the memory 54 an accessor 58 associated with the value 56 and capable of applying the operation to the value 58 in the region 72 of the memory 54, and to invoke the accessor 58. The exemplary method 80 also involves executing 98 the instructions on the processor 52. By storing in the memory 54 and executing on the processor 52 instructions configured to facilitate the storing of and operating on the value 56 through the accessors 58, the exemplary method 80 thereby promotes the consistent accessing of the value 56, and so ends at 100.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 62 of FIG. 3 and the exemplary method 80 of FIG. 4) to confer individual and/or synergistic advantages upon such embodiments.

A first aspect that may vary among embodiments of these techniques relates to the types of values 56 and the types of accessors 58 that may apply various operations to such values 56. As a first example, the values 56 may comprise many types of data produced by the instruction sets, such as primitive values (e.g., integers, floating-point numbers, characters, and strings.) The values 56 may also comprise data structures that aggregate several primitive values and/or other data structures, such as instances of a class having many class members, or a data container, such as an array, a linked list, a tree, a stack, a queue, a heap, a hashtable, etc. The values 56 may also comprise a memory reference to a portion of memory containing another value, such as a pointer referencing a class instance. As a second example, the accessors 58 associated with such values 56 may be configured to apply many types of operations to the values 56. For example, a particular value 56 may be associated with one or more of: a store accessor configured to store the value 56 in the region 72 of the memory 54; a load accessor configured to load the value 56 from the region 72 of the memory 54; a mathematical accessor configured to apply a mathematical operation (e.g., an increment or addition operation) to the value 56; a Boolean accessor configured to apply a Boolean operation to the value 56 (e.g., a NOT operation configured to invert a bit series or to flip a Boolean value); and a comparison accessor configured to apply a comparison operation to the value 56 (e.g., by comparing whether or not an integer is equal to zero, or whether a stored Boolean value equals TRUE.) It may be advantageous to choose accessors that correspond to particular instructions, such as the set of assembly-level instructions that access the value (e.g., a load accessor corresponding to an assembly LD instruction; an addition mathematical accessor corresponding to an assembly ADD instruction; etc.) This selection may facilitate the selection of an accessor corresponding to a value-accessing operation in the instruction set by providing a direct mapping of value-accessing assembly instructions to accessors.

Figure 5:
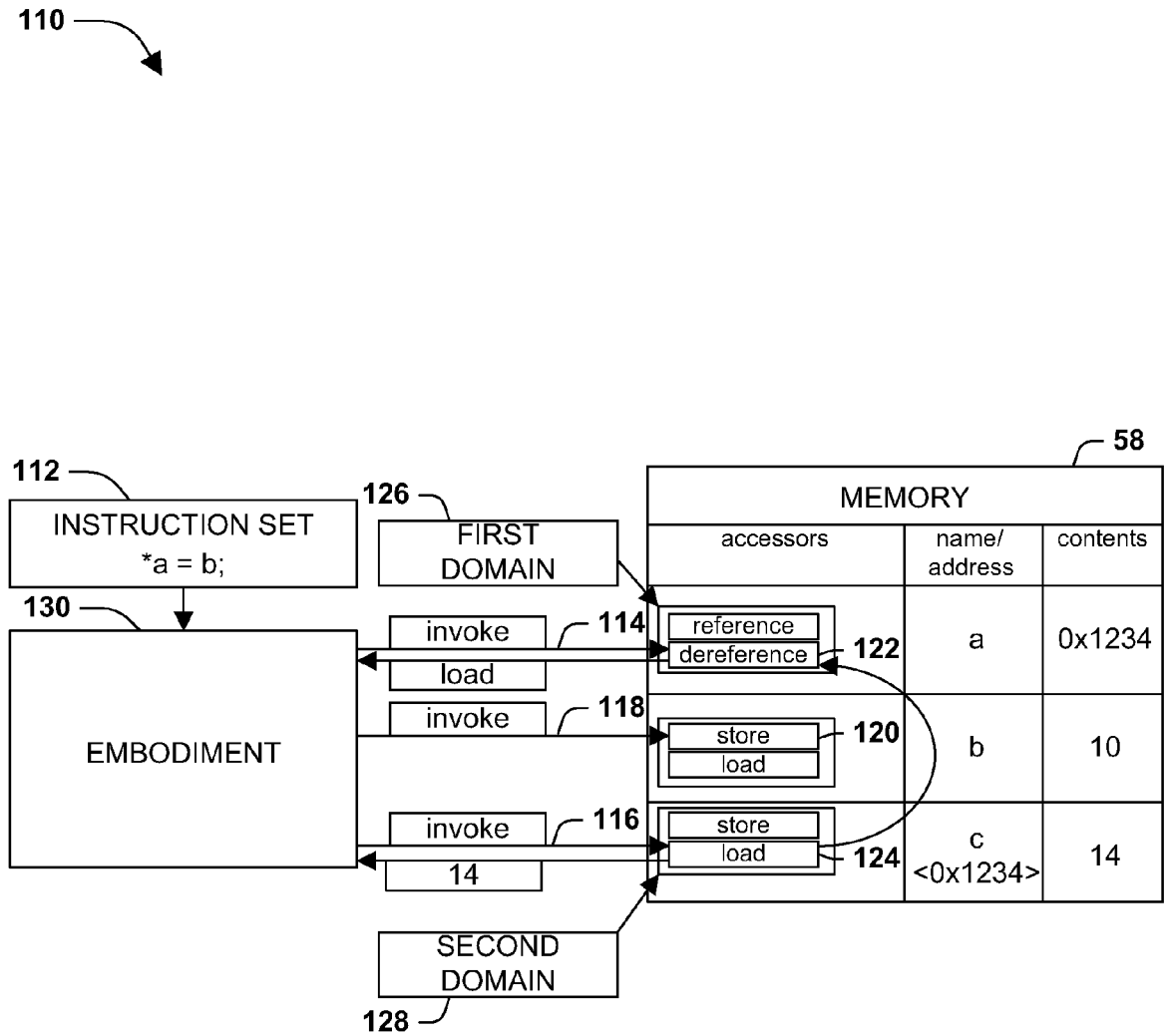
FIG. 5 is an illustration of an exemplary scenario involving the dereferencing of a stored reference to another stored value through a set of accessors associated with respective values.

In some scenarios, a value stored in the region of memory may represent a reference to another value in memory, which may be created by the same domain that created the reference value, or even a different domain. In such scenarios, embodiments of these techniques may be configured to associate with the reference value at least one accessor, which may be associated with the second value and configured to operate on the first value. FIG. 5 presents an exemplary scenario 110 wherein a memory 58 contains a first value (associated with the symbol name "a") created by a first domain 126, wherein the first value comprises a reference to a second value ("c") generated by a second domain 128 and stored at a particular memory address contained by the first value. As discussed herein, respective values are associated with one or more accessors each of which may be configured to apply a particular type of operation to the value. For example, the first value is associated with a memory referencing accessor configured to store the first value as a reference to the third value (e.g., configured to store the memory address <0x1234> where the third value is stored), and a memory dereferencing accessor 122 configured to dereference the first value, e.g., by retrieving from the memory 58 a load accessor 124 stored in the region and associated with the value, and by invoking the load accessor 124 to retrieve the third value. In this exemplary scenario 110, an instruction set 112 involves an operation ("b=*a;") that sets a third value to the second value referenced by the first value.

In order to fulfill the operations specified in the instruction set 112 of FIG. 5, an embodiment 130 may be configured to select and invoke accessors for various values that perform the elements of the operation with respect to the referenced values. For example, the embodiment 130 may perform a first invoking 116 of a dereferencing accessor 122 associated with the first value, which may translate the invoking by retrieving an appropriate accessor associated with the referenced value (in this case, the "load" accessor 124 associated with the third value "c".) The embodiment 130 may then perform a second invoking 116 of the provided accessor to perform the operation specified in the instruction set 112 (in this case, the "load" operation.) The load accessor 124 may therefore return the current value associated stored for the referenced third value—in this case, the integer 14. Finally, the embodiment 130 may perform a third retrieving and invoking 118 of an appropriate accessor for the third value (in this case, a store accessor 120) to complete the operation (in this case, writing the integer "14" over the integer "10" that was previously stored for the third value.) In this manner, the embodiment 130 may complete the operation in the instruction set 112, despite the generation of the values by different domains, potentially having different properties, and even involving an appropriate dereferencing.

In other scenarios, the use of accessors may permit the application of an operation to a value in a different manner than may be achieved by directly accessing the value to perform the operation. For example, a value may induce an effect when an operation is performed on it (e.g., a request to perform a function on a value, such as may be invoked in a debugging domain, may actually and undesirably alter the value.) An accessor may be configured to perform these operations in a different manner that avoids the undesired effects, such as simulating the operation (instead of actually performing the operation) and providing the result. For example, rather than invoking a computing environment function to access a value (which may induce one or more effects, such as altering the stored value), a debugging domain may associate with a value an accessor that simulates the computing environment function without inducing the effects (e.g., by temporarily storing the original value elsewhere in memory, invoking the function that alters the value, and then re-storing the original value to replace the altered value.) In this manner, the debugging domain may perform debugging functions, such as the evaluation of functions and values, without jeopardizing the safety and consistency of the stored value and the instruction set operating thereupon. Those of ordinary skill in the art may devise many types of values and many operations that may be applied thereto by a set of accessors associated with the respective values in accordance with the techniques discussed herein.

A second aspect that may vary among embodiments of these techniques relates to the associating of accessors with a particular value. As a first example, respective accessors may comprise a set of instructions for performing an operation, such as a set of lambda expressions; and when a value is stored in the region of the memory by a domain, the instruction sets may be stored along with the value (e.g., a stack slot holding an object may contain a set of instructions for performing each type of operation.) Alternatively, a set of function pointers, such as delegated functions that perform various operations, may be stored with the value in the region. As a second alternative, a proxy accessor object may be stored with the value in the region that is configured to perform various operations on the value. A second variation of this second aspect involves the manner of associating the accessors with the value. For example, the accessors may be stored with the value in the region of memory (e.g., stored in the memory addresses following the value.) Alternatively, the accessors may be stored in a particular region of memory, and the stored value may include a reference to the accessors. This configuration may be helpful for promoting reuse of accessors for similar value types; e.g., all integers generated by a particular domain may be stored in the region of the memory with a pointer to a set of accessors that may be used to operate on any such integer. A third variation of this second aspect involves the manner in which accessors are selected by embodiments of these techniques for association with a particular value. For example, the embodiment may, upon receiving the request to store a particular value, attempt to identify its type and select corresponding accessors from a set of available accessors (e.g., a first set of accessors for 16-bit signed integers, a second set of accessors for 32-bit unsigned integers, etc.) Alternatively, a domain may provide or specify a set of accessors with the request to store the value, and the embodiment may be configured to receive the accessors from the domain, store the accessors in the region (e.g., as instruction sets, lambda expressions, pointers, proxy objects, etc.), and associate the accessors with the value. Those of ordinary skill in the art may devise many techniques for selecting and associating accessors for particular stored values while implementing the techniques discussed herein.

A third aspect that may vary among embodiments of these techniques relates to the manner of storing the value in the region of memory. As a first variation, embodiments of these techniques may simply store the value specified in the request (e.g., as a boxed or unboxed primitive value, as an instance of an object, etc.) Alternatively, embodiments may wrap the provided value in an interface, such as a proxy object that regulates the application of operations to the value by retrieving and invoking accessors corresponding to the operations.

As a second variation, the stored values may be formatted in many ways. As a first example, the memory comprising the values may have certain properties that may result in a preferential storing in a particular format (e.g., a 64-bit word size memory may promote the storing of 64-bit integers and 64-bit memory pointers over similar values of other sizes, and fragmented memory may promote the storing of large arrays as linked lists instead of offset-indexable blocks of memory.) As a second example, a target instruction set may declare and use values (such as integers) in one format, while other instruction sets that access the value may wish to access it in another format, such as may be defined (e.g.) by a protocol standard whereby the instruction sets share values. In these and other scenarios, the stored value, originally generated in a source format, may be reformatted according to a target format (e.g., reformatting 32-bit integer as a 64-bit integer; reformatting a variable-length, null-terminated ASCII string to a fixed-length Unicode string; or boxing or unboxing a primitive type.)

In order to implement this second variation, the formatting of the value according to the target format may be performed in many ways. As a first example, an accessor may be configured, upon receiving a value to be stored, to format the value according to the target format prior to storing the (reformatted) value. As a second example, an accessor may be configured, upon receiving a request to retrieve a value stored in memory, to format the retrieved value according to the target format prior to providing the (reformatted) value in fulfillment of the request. This formatting may occur automatically (e.g., the accessor may silently reformat the value based on a particular target format while fulfilling any request to load the value) or upon request (e.g., the accessor may allow a request to specify a target format according to which the value is reformatted.) In some scenarios, the formatting may encounter difficulties; if an accessor is requested to format a 64-bit value as a 32-bit value, it may attempt to fulfill the request by truncating or rounding the value, or may notify the requester of the problem by returning an error or throwing an exception, etc. Those of ordinary skill in the art may devise many types of accessors that format values according to target formats while implementing the techniques discussed herein.

As a third variation, the value may be stored with various types of descriptors that facilitate the performing of these techniques. This example may be particularly useful for references; e.g., a reference value may specify a memory address (as an integer) of a second value. It may be permissible to cast the memory address to an integer type, which may be helpful for examining object identity, etc.; however, it may be additionally helpful to store with the reference, and with the integer, some information as to the type of value stored at the memory address specified by the reference or integer. Embodiments of these techniques may then use such descriptors to verify the validity of such operations, and such verifications may even be built into one or more accessors. For example, a referencing accessor for a first value may reference a memory address containing a second value of a particular value type. It may be valid (both according to the grammar of the instruction set and to the safety of the operating environment) to permit a reassigning of the first value to a memory address containing a third value of the same value type (e.g., an integer pointer may be reassigned from referencing a first integer at a memory address to referencing a second integer at a different memory address.) However, it may be logically invalid to (even if grammatically valid) to reassign the first value to a memory address containing a value of a different value type (e.g., attempting to reassign an integer pointer to reference a non-integer value.) In order to reduce such problems by storing with the value (e.g., upon receiving a request to store an integer pointer generate by a domain) a descriptor indicating the type of value stored at the address of the reference. Subsequently, upon receiving a request to operate on the value (e.g., to assign a new the memory address to an integer pointer), the descriptor can be used to verify the validity of the operation (e.g., by verifying that the value stored at the specified memory address matches the value type referenced by the reference value.) Those of ordinary skill in the art may devise many uses for such descriptors, and for such other variable properties of associated accessors and stored values, while implementing the techniques discussed herein.

A fourth aspect that may vary among embodiments of these techniques relates to the types of domains defined in the memory and with which these techniques may be utilized. As a first variation, a domain may be configured to store values in a shared region of memory, and to utilize accessors associated with the stored values to perform operations on the value. As a second variation, a domain may comprise a local region of memory that is predominantly accessible only by instruction sets executing within the domain, and in this local region of memory one or more local values may be stored. However, the local domain may store in a shared region of memory a value referencing a local value (e.g., a pointer to a locally stored value), and may associate with the value in the shared region of memory one or more accessors configured to operate on the local value. For example, the local domain may permit other domains to access the locally stored value only through accessors provided in a proxy object that is stored with the reference value in the shared region of memory. The accessors may therefore validate the requested operations on the locally stored value, thereby extending access to the local value to other domains while preserving the security of the value through the validating accessors. This configuration may also be useful, e.g., where a local domain includes an interpreter that interpretively executes instruction sets that may comprise one or more static values. For example, references to the value may be generated and removed from the shared region of memory as the static variable transitions from in-scope to out-of-scope, but the local domain may preserve the static value as a local value throughout the lifetime of the static value. As a fourth variation, these techniques may be utilized to manage the accessing of values in the region of memory by a set of domains that may vary in many aspects. As a first example, the domains may differ in the manner of accessing the region of memory and of storing even similar values in the region (e.g., a first domain may store integers in little-Endian format, while a second domain may store integers in big-Endian format.) As a second example, the domains may differ in the executing of instruction sets, such as a natively executing domain, an interpretively executing domain, a virtually executing domain, and a debugging executing domain. As a third example, the domains that access a particular value may execute the same instruction set in different contexts, or may execute different instruction sets; e.g., a first domain may execute a first instruction set written in a first language, while a second domain may execute a second instruction set written in a second language. Even such language differences may be resolved by utilizing the techniques discussed herein to regulate the accessing of the values stored in the region (e.g., a load accessor may be configured to load a value stored according to the standards of the generating domain, and may either provide the value represented according to those standards or to another set of standards supported by the requesting domain.) Those of ordinary skill in the art may devise many types of domains that may access such stored values, and many embodiments of these techniques that support such varied domains, while implementing the techniques discussed herein.

Figure 6:
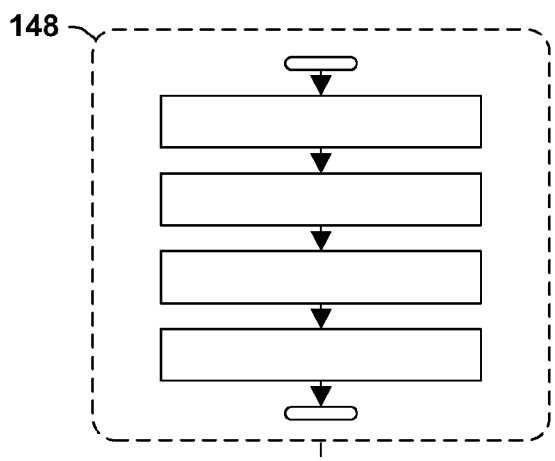
FIG. 6 is an illustration of an exemplary computer-readable medium comprising processor-executable instructions configured to embody one or more of the provisions set forth herein.
Figure 6:
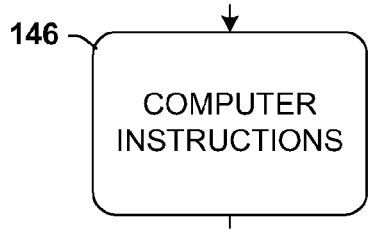
Figure 6:
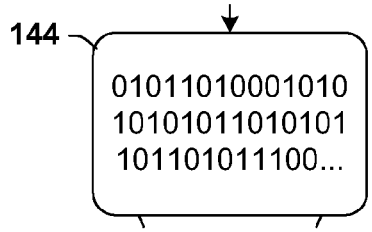
Figure 6:
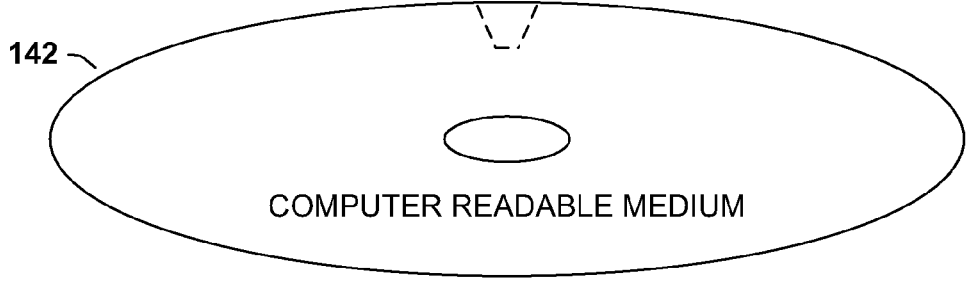

Still another embodiment involves a computer-readable medium comprising processor-executable instructions configured to apply the techniques presented herein. An exemplary computer-readable medium that may be devised in these ways is illustrated in FIG. 6, wherein the implementation 150 comprises a computer-readable medium 152 (e.g., a CD-R, DVD-R, or a platter of a hard disk drive), on which is encoded computer-readable data 154. This computer-readable data 154 in turn comprises a set of computer instructions 156 configured to operate according to the principles set forth herein. In one such embodiment, the processor-executable instructions 156 may be configured to perform a system configured to store values generated by at least two domains in a region of a memory of a computer having a processor, such as the exemplary system 62 of FIG. 3. In another such embodiment, the processor-executable instructions 156 may be configured to implement a method of storing values generated by at least two domains in a region of a memory, such as the exemplary method 80 of FIG. 4. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 7:
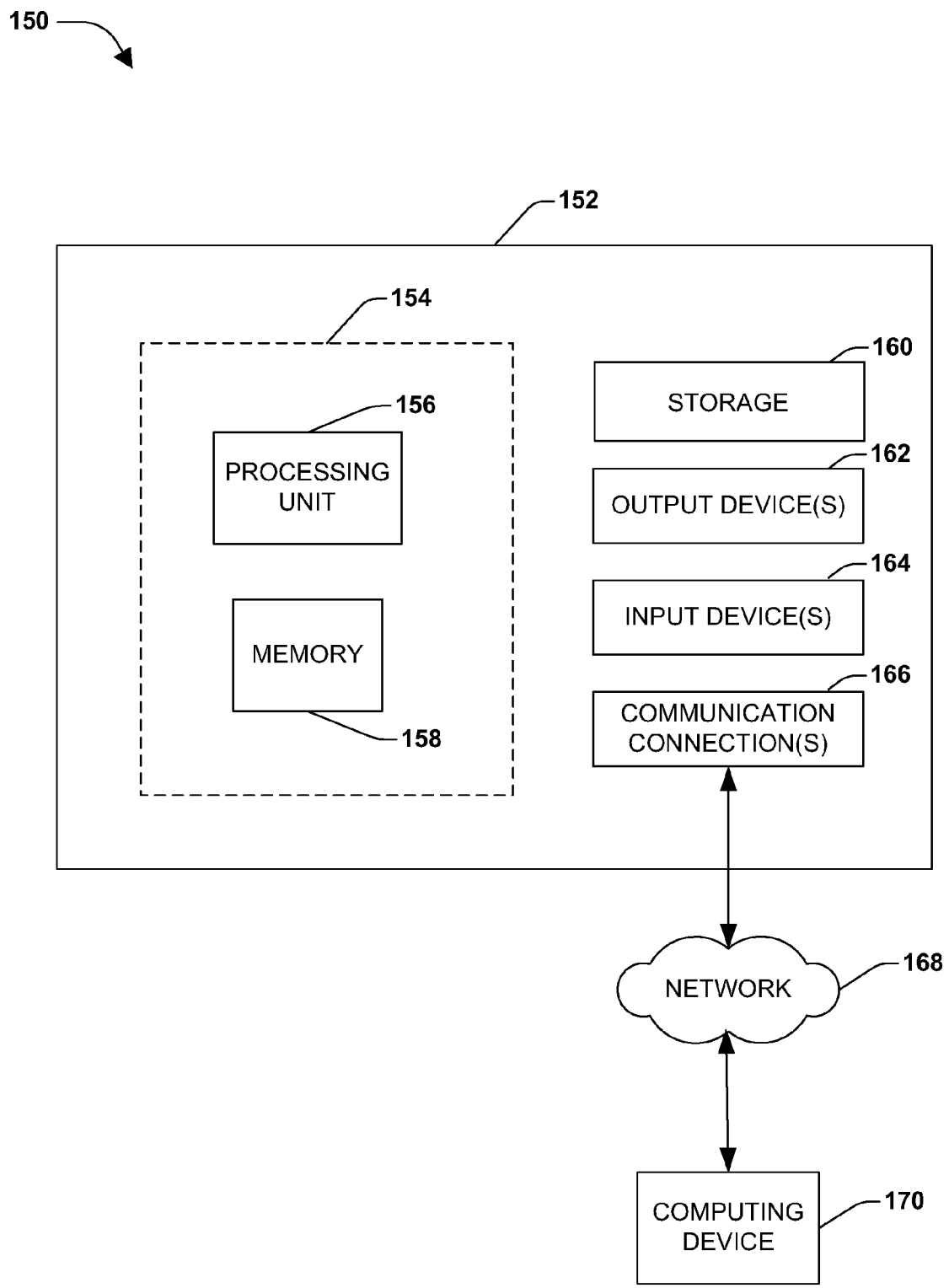
FIG. 7 illustrates an exemplary computing environment wherein one or more of the provisions set forth herein may be implemented.

FIG. 7 and the following discussion provide a brief, general description of a suitable computing environment to implement embodiments of one or more of the provisions set forth herein. The operating environment of FIG. 7 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 illustrates an example of a system 160 comprising a computing device 162 configured to implement one or more embodiments provided herein. In one configuration, computing device 162 includes at least one processing unit 166 and memory 168. Depending on the exact configuration and type of computing device, memory 168 may be volatile (such as RAM, for example), non-volatile (such as ROM, flash memory, etc., for example) or some combination of the two. This configuration is illustrated in FIG. 7 by dashed line 164.

In other embodiments, device 162 may include additional features and/or functionality. For example, device 162 may also include additional storage (e.g., removable and/or non-removable) including, but not limited to, magnetic storage, optical storage, and the like. Such additional storage is illustrated in FIG. 7 by storage 170. In one embodiment, computer readable instructions to implement one or more embodiments provided herein may be in storage 170. Storage 170 may also store other computer readable instructions to implement an operating system, an application program, and the like. Computer readable instructions may be loaded in memory 168 for execution by processing unit 166, for example.

The term "computer readable media" as used herein includes computer storage media. Computer storage media includes volatile and nonvolatile, removable and non-removable media implemented in any method or technology for storage of information such as computer readable instructions or other data. Memory 168 and storage 170 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 162. Any such computer storage media may be part of device 162.

Device 162 may also include communication connection(s) 176 that allows device 162 to communicate with other devices. Communication connection(s) 176 may include, but is not limited to, a modem, a Network Interface Card (NIC), an integrated network interface, a radio frequency transmitter/receiver, an infrared port, a USB connection, or other interfaces for connecting computing device 162 to other computing devices. Communication connection(s) 176 may include a wired connection or a wireless connection. Communication connection(s) 176 may transmit and/or receive communication media.

Device 162 may include input device(s) 174 such as keyboard, mouse, pen, voice input device, touch input device, infrared cameras, video input devices, and/or any other input device. Output device(s) 172 such as one or more displays, speakers, printers, and/or any other output device may also be included in device 162. Input device(s) 174 and output device(s) 172 may be connected to device 162 via a wired connection, wireless connection, or any combination thereof. In one embodiment, an input device or an output device from another computing device may be used as input device(s) 174 or output device(s) 172 for computing device 162.

Components of computing device 162 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 162 may be interconnected by a network. For example, memory 168 may be comprised of multiple physical memory units located in different physical locations interconnected by a network.

Those skilled in the art will realize that storage devices utilized to store computer readable instructions may be distributed across a network. For example, a computing device 180 accessible via network 178 may store computer readable instructions to implement one or more embodiments provided herein. Computing device 162 may access computing device 180 and download a part or all of the computer readable instructions for execution. Alternatively, computing device 162 may download pieces of the computer readable instructions, as needed, or some instructions may be executed at computing device 162 and some at computing device 180.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of storing values generated by at least two domains in a region of a memory of a computer having a processor, the method comprising:

storing in the memory instructions configured to:
upon receiving a request to store a value generated by a first domain:
store the value in the region of the memory, and
associate with the value an accessor set comprising at least one accessor comprising a set of instructions associated with the domain and configured, when executed on the processor, to operate on the value stored in the region of the memory; and
upon receiving from a second domain that is different from the first domain a request to apply an operation to the value:
retrieve from the accessor set the accessor associated with the value and capable of applying the operation to the value in the region of the memory; and
invoke the accessor; and
executing the instructions on the processor.

2. The method of claim 1, respective accessors comprising:
a store accessor configured to store the value in the region of the memory;
a load accessor configured to load the value from the region of the memory;
a mathematical accessor configured to apply a mathematical operation to the value;
a Boolean accessor configured to apply a Boolean operation to the value; or
a comparison accessor configured to apply a comparison operation to the value.

3. The method of claim 1, the memory storing:
a second value associated with a second domain and representing a reference to the value, and
at least one second accessor associated with the second value and configured to operate on the value.

4. The method of claim 3, the at least one second accessor selected from a group comprising:
a memory referencing accessor configured to store the second value as a reference to the value, and
a memory dereferencing accessor configured to dereference the second value by:
retrieving from the memory a load accessor associated with the value, and
invoking the load accessor to retrieve the value.

5. The method of claim 1:
at least one operation applied to a value within a domain configured to induce at least one effect when executed within the domain, and
at least one accessor configured to perform the operation within the domain without inducing the at least one effect when executed within the domain.

6. The method of claim 1, associating the value with the at least one accessor associated with the domain comprising:
receiving the at least one accessor from the domain;
storing the at least one accessor in the region; and
associating the at least one accessor with the value.

7. The method of claim 1, the instructions comprising:
upon receiving the request to store the value generated by the domain, store in the region at least one descriptor of the value.

8. The method of claim 1:
at least one domain comprising a local domain configured to store at least one local value in a local region of the memory associated with the local domain, and at least one value in the region of memory referencing the local value in the local region associated with the local domain; and
the local domain associated with at least one accessor configured to operate on the local value stored with the at least one accessor in the local region of the memory.

9. The method of claim 8:
the memory comprising:
an instruction set configured to store the values in the region of the memory and associated with a domain, and
an interpreter configured to execute the instruction set and associated with the local domain.

10. The method of claim 9:
at least one value associated with the domain of the instruction set comprising a static value, and the interpreter configured to manage lifetime of the static value.

11. The method of claim 1, the at least two domains comprising:
a first domain associated with values created in a first language, and
a second domain associated with values created in a second language.

12. The method of claim 1, at least one accessor configured to convert the value to a target format upon:
storing the value in the memory, or
loading the value from the memory.

13. A system configured to store values generated by at least two domains in a region of a memory of a computer having a processor, the system comprising:
a value storing component comprising instructions stored in the memory that are configured to, when executed on the processor, upon receiving a request to store a value generated by a first domain:
store the value in the region of the memory, and
associate with the value an accessor set comprising at least one accessor comprising a set of instructions associated with the domain and configured to, when executed on the processor, operate on the value stored in the region of the memory; and
a value operating component comprising instructions stored in the memory that are configured to, when executed on the processor, upon receiving a request from a second domain that is different from the first domain to apply an operation to the value:
retrieve from the accessor set the accessor associated with the value and capable of applying the operation to the value in the region of the memory; and
invoke the accessor.

14. The system of claim 13, at least one accessor comprising:
a store accessor configured to store the value in the region of the memory;
a load accessor configured to load the value from the region of the memory;
a mathematical accessor configured to apply a mathematical operation to the value;
a Boolean accessor configured to apply a Boolean operation to the value; or
a comparison accessor configured to apply a comparison operation to the value.

15. The system of claim 13:
the memory storing:
a second value associated with a second domain and representing a reference to the value, and
at least one second accessor associated with the second value and configured to operate on the value.

16. The system of claim 13, the value storing component configured to associate the value with the at least one accessor associated with the domain by:
receiving the at least one accessor from the domain;
storing the at least one accessor in the region; and
associating the at least one accessor with the value.

17. The system of claim 13:
at least one domain comprising a local domain configured to store at least one local value in a local region of the memory associated with the local domain, and at least one value in the region of memory referencing the local value in the local region associated with the local domain; and
the local domain associated with at least one accessor configured to operate on the local value stored with the at least one accessor in the local region of the memory.

18. The system of claim 17:
the memory comprising:
an instruction set configured to store the values in the region of the memory and associated with a domain, and
an interpreter configured to execute the instruction set and associated with the local domain.

19. The system of claim 18:

at least one value associated with the domain of the instruction set comprising a static value, and the interpreter configured to manage lifetime of the static value.

20. A computer-readable storage media comprising instructions configured to, when stored in a memory of a computer and executed on a processor of the computer, store values generated by at least two domains in a region of the memory by:

upon receiving a request to store a value generated by a first domain:

storing the value in the region of the memory, and associate with the value an accessor set comprising at least one accessor comprising a set of instructions associated with the domain and configured to, when executed on the processor, operate on the value stored in the region of the memory; and upon receiving a request from a second domain that is different from the first domain to apply an operation to the value:

retrieving from the accessor set the accessor associated with the value and capable of applying the operation to the value in the region of the memory; and invoking the accessor.

* * * * *